United States Patent
DeLuca et al.

(10) Patent No.: US 9,858,070 B2
(45) Date of Patent: Jan. 2, 2018

(54) DEVELOPMENT TEAM FILE COLLABORATION

(71) Applicant: International Business Machines Corporation, Armonk, NY (US)

(72) Inventors: Lisa Seacat DeLuca, Baltimore, MD (US); Dana L. Price, Surf City, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/874,735

(22) Filed: Oct. 5, 2015

(65) Prior Publication Data
US 2017/0097822 A1    Apr. 6, 2017

(51) Int. Cl.
*G06F 9/44* (2006.01)
*G06Q 10/06* (2012.01)

(52) U.S. Cl.
CPC .............. *G06F 8/71* (2013.01); *G06F 8/20* (2013.01); *G06Q 10/06* (2013.01)

(58) Field of Classification Search
CPC ............. G06F 8/20; G06F 8/71; G06Q 10/06
USPC ........................................ 717/101, 120, 122
See application file for complete search history.

(56) References Cited

U.S. PATENT DOCUMENTS

| | | | |
|---|---|---|---|
| 6,507,845 B1 * | 1/2003 | Cohen | G06Q 10/10 707/608 |
| 8,060,855 B2 | 11/2011 | Hegde et al. | |
| 8,627,308 B2 | 1/2014 | DeLuca et al. | |
| 2005/0097508 A1 * | 5/2005 | Jacovi | G06F 9/4446 717/103 |
| 2007/0283321 A1 * | 12/2007 | Hegde | G06F 8/71 717/110 |
| 2008/0005235 A1 | 1/2008 | Hegde et al. | |
| 2008/0134298 A1 * | 6/2008 | Nathan | G06F 8/20 726/4 |
| 2009/0019120 A1 | 1/2009 | Muguda | |
| 2012/0117541 A1 * | 5/2012 | Bates | G06F 11/362 717/125 |
| 2012/0297363 A1 | 11/2012 | Perisic et al. | |
| 2013/0218867 A1 | 8/2013 | DeLuca et al. | |
| 2013/0247004 A1 * | 9/2013 | DeLuca | G06F 15/16 717/120 |
| 2014/0089897 A1 | 3/2014 | Deluca et al. | |

(Continued)

OTHER PUBLICATIONS

Bani-Salameh et al., "Integrating Collaborative Program Development and Debugging within a Virtual Environment", 2008.*

(Continued)

*Primary Examiner* — Phillip H Nguyen
(74) *Attorney, Agent, or Firm* — Edward J. Wixted, III

(57) ABSTRACT

In an approach for dynamically collaborating with respect to a file within an integrated development environment (IDE), a processor receives from a first IDE of a first user, a selection of a first version of a source code file associated with a software development project. A processor receives a choice of one or more file identification parameters for the first version of the source code file. A processor retrieves a list of users assigned to the software development project, including at least a second user. A processor causes the source code file to be identified in a second IDE of the second user.

16 Claims, 3 Drawing Sheets

(56) References Cited

U.S. PATENT DOCUMENTS

| | | | | |
|---|---|---|---|---|
| 2014/0258894 A1* | 9/2014 | Brown | ............... | G06F 8/38 |
| | | | | 715/762 |
| 2014/0258968 A1* | 9/2014 | Brown | ............... | G06F 17/21 |
| | | | | 717/103 |
| 2014/0258969 A1* | 9/2014 | Brown | ............... | G06F 8/30 |
| | | | | 717/103 |
| 2014/0258970 A1* | 9/2014 | Brown | ............... | G06F 8/47 |
| | | | | 717/103 |
| 2014/0310678 A1* | 10/2014 | Howard | ............... | G06F 8/20 |
| | | | | 717/100 |
| 2016/0224337 A1* | 8/2016 | Xia | ............... | G06F 8/71 |

OTHER PUBLICATIONS

Lanza et al., "Supporting Collaboration Awareness with Real-time Visualization of Development Activity", 2010.*
Cook et al., "Modelling and Measuring Collaborative Software Engineering", 2005.*
Cheng et al., "Jazzing up Eclipse with Collaborative Tools", 2003.*
"Real-Time Distributed Software Development", SAROS, Printed on: Jul. 13, 2015, 2 pages, <http://www.saros-project.org/>.
"Developers collaboration tool for IntelliJ IDEA Java IDE", IDEtalk, Mar. 28, 2013; 1 page, <http://web.archive.org/web/20120122094723/http://www.idetalk.com/>.
Patent Cooperation Treaty, International Search Report and Written Opinion for PCT/EP2013/052379 dated Apr. 18, 2013, 11 pages.

* cited by examiner

DEVELOPMENT TEAM FILE COLLABORATION

BACKGROUND

The present invention relates generally to the field of integrated development environment (IDE), and more particularly to allowing users of an IDE to collaborate with respect to a set of files.

An IDE is a software application that provides comprehensive facilities to computer programmers for software development. An IDE normally consists of a source code editor, build automation tools, and a debugger. IDEs are designed to maximize programmer productivity by providing tight-knit components with similar user interfaces. IDEs present a single program in which all development can be done.

Source code is any collection of computer instructions, possibly with comments, written using some human-readable computer language, usually as text. The source code of a program is specially designed to facilitate the work of computer programmers, who specify the actions to be performed by a computer mostly by writing source code. The source code is often transformed by a compiler program into low-level machine code understood by the computer. Alternatively, an interpreter can be used to analyze and perform the outcomes of the source collaborating program direction on the fly.

SUMMARY

Aspects of an embodiment of the present invention disclose a method, computer program product, and computer system for dynamically collaborating with respect to a set of files within an integrated development environment (IDE). A processor receives from a first IDE of a first user, a selection of a first version of a source code file associated with a software development project. A processor receives a choice of one or more file identification parameters for the first version of the source code file. A processor retrieves a list of users assigned to the software development project, including at least a second user. A processor causes the source code file to be identified in a second IDE of the second user.

DETAILED DESCRIPTION

Embodiments of the present invention recognize that when a project grows, it can be difficult to find specific files or areas of code that a user might want to discuss with a team member in a team collaborative development environment. Embodiments of the present invention also recognize that oftentimes multiple files will exist with the same name in the same source tree, or just finding a specific file within numerous projects or multiple level hierarchical trees is time consuming and difficult. Embodiments of the present invention recognize that a solution that allows users to collaborate with respect to a set of files with team members is needed.

Embodiments of the present invention will now be described in detail with reference to the Figures.

Figure 1:
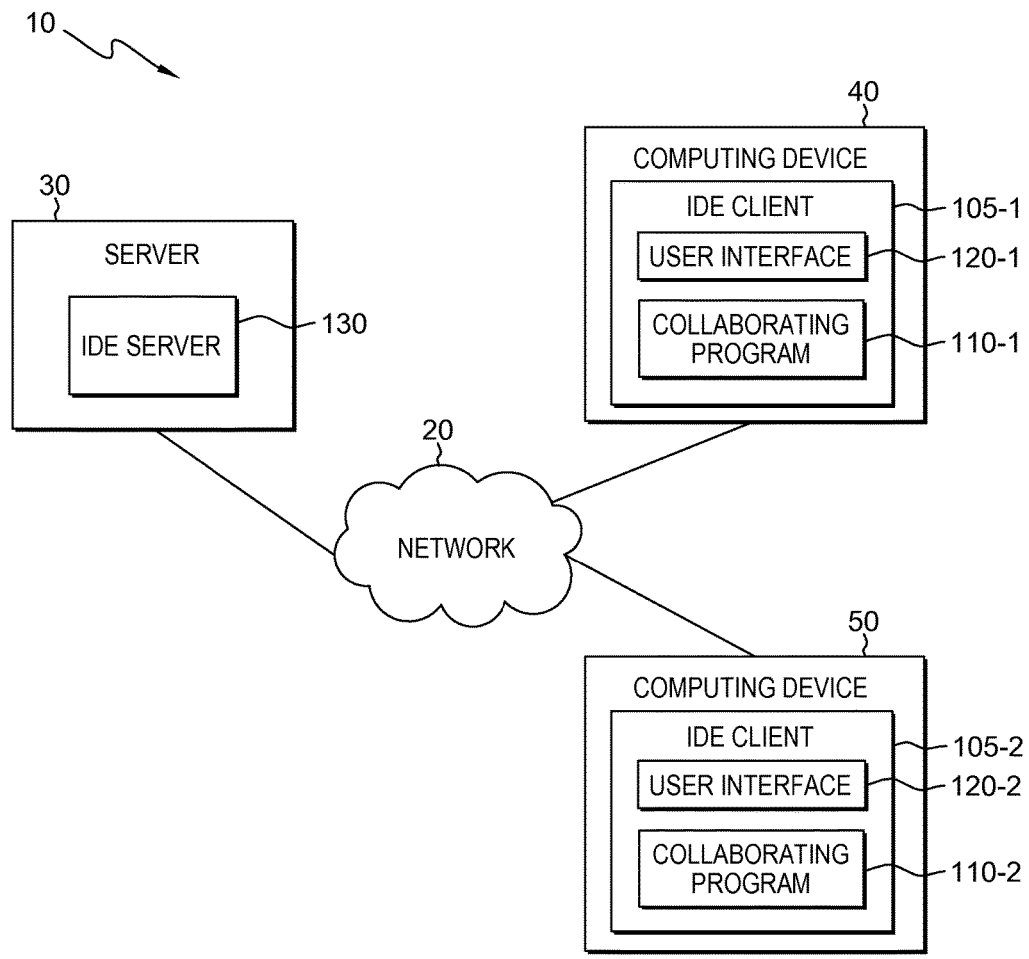
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, IDE client 105 could be IDE client 105-1, IDE client 105-2, or another IDE client 105 on another computing device. Collaborating program 110 could be collaborating program 110-1, collaborating program 110-2, or another collaborating program 110 on another computing device. User interface 120 could be user interface 120-1, user interface 120-2, or another user interface 120 on another computing device.

In the depicted embodiment, computing system 10 includes server 30, computing device 40, and computing device 50 interconnected over network 20. Network 20 may be a local area network (LAN), a wide area network (WAN) such as the Internet, a cellular data network, any combination thereof, or any combination of connections and protocols that will support communications between server 30, computing device 40, and computing device 50, in accordance with embodiments of the invention. Network 20 may include wired, wireless, or fiber optic connections. Computing system 10 may include additional computing devices, servers, or other devices not shown. For simplicity purposes, only two computing devices 40 and 50, IDE clients 105-1 and 105-2, collaborating programs 110-1 and 110-2, and user interfaces 120-1 and 120-2 are shown in FIG. 1, although in other embodiments, computing system 10 can include additional computing devices, IDE clients, collaborating programs, and user interfaces.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 and computing device 50 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains IDE server 130. In other embodiments, server 30 may include other components, as depicted and described in further detail with respect to FIG. 3.

Computing devices 40 and 50 may be desktop computers, laptop computers, netbook computers, or tablet computers, or any type of computing devices capable of hosting an IDE client. In general, computing devices 40 and 50 may be any electronic devices or computing systems capable of processing program instructions, sending and receiving data, and communicating with server 30 via network 20. In the depicted embodiment, computing devices 40 and 50 contain IDE client 105-1 and 105-2, respectively. IDE clients 105-1 and 105-2 contain user interfaces 120-1 and 120-2, respectively, and collaborating program 110-1 and 110-2, respectively. In other embodiments, computing devices 40 and 50 may include other components, as depicted and described in further detail with respect to FIG. 3.

In some embodiments of the present invention, an IDE with collaborative functionality may provide software developers the ability to collaborate about the software the developers may be producing while the developers are programming. In some embodiments, the IDE may be implemented as a client/server program, in which a portion of the IDE, IDE server 130, is provided on server 30, and other portions, IDE clients 105-1 and 105-2, are provided on computing devices 40 and 50, respectively. Software developers, typically, will directly interact with IDE clients 105-1 and 105-2.

Collaborating program 110 allows users of an IDE to collaborate with respect to a set of files. In doing so, collaborating program 110 receives a selection of a file about which the first user wants to collaborate with the second user. Collaborating program 110 receives a choice of identification parameters for the file(s) to be selected. Collaborating program 110 retrieves, at least, a second user, based on a selection from a first user, with whom to collaborate. Collaborating program 110 causes the selected file to be identified for the second user. In the depicted embodiment, collaborating program 110 is a function of IDE client 105 and resides on computing device 40 and computing device 50. In other embodiments, collaborating program 110 may stand alone and reside on another computing device or another server, provided that collaborating program 110 can access IDE client 105, user interface 120, and IDE server 130 via network 20.

User interface 120 may be any user interface used to access information from server 30, such as information gathered or produced by collaborating program 110. Additionally, user interface 130 may be any user interface used to supply information to server 30, such as information gathered by a user to be used by collaborating program 110. In other embodiments, user interface 120 may be a software program or application that enables a user at computing device 40 or computing device 50 to access server 30 over network 20. In other embodiments, user interface 120 is a graphical user interface. In the depicted embodiment, user interface 120 resides within IDE client 105 on computing device 40 and computing device 50. In other embodiments, user interface 120, or similar user interfaces, may stand alone and reside on another computing device or another server, provided that user interface 120 is accessible to IDE client 105 and collaborating program 110.

The terms "user" and "developer" are used interchangeably herein.

Figure 2:
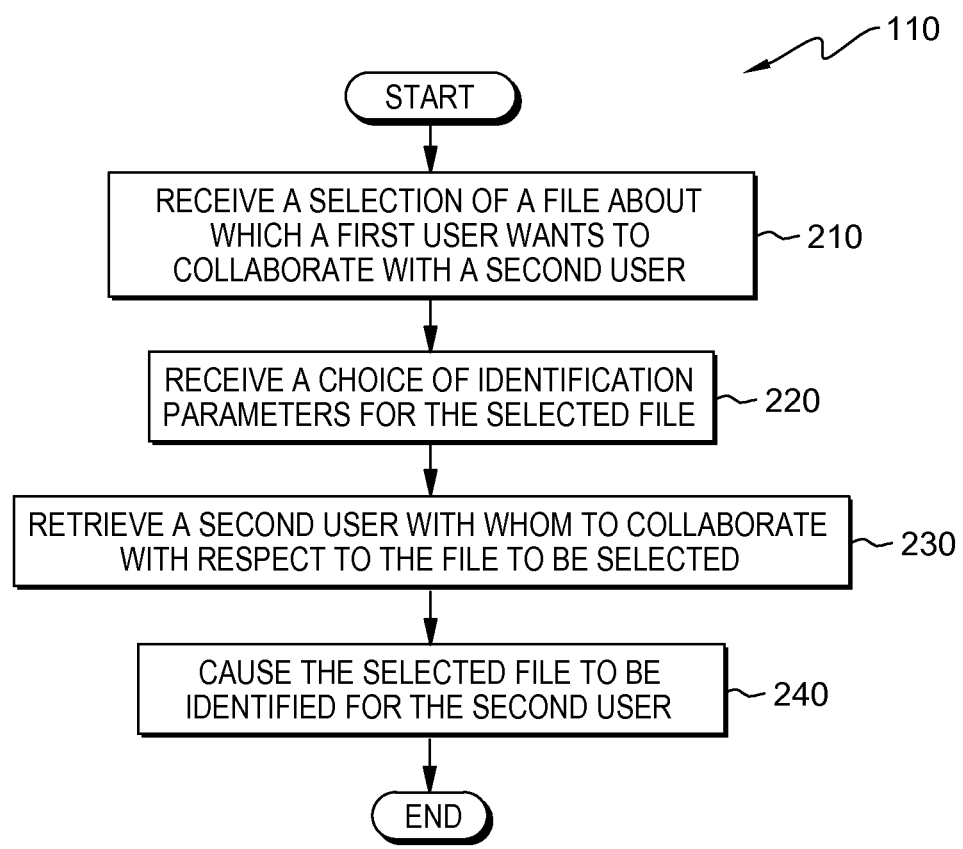
FIG. 2 depicts a flowchart of the steps of a collaborating program, executing within the computing system of FIG. 1, for allowing users of an IDE to collaborate with respect to a set of files, in accordance with an embodiment of the present invention.

FIG. 2 depicts a flowchart of the steps of a collaborating program, executing within the computing system of FIG. 1, in accordance with an embodiment of the present invention. Collaborating program 110 allows users of an IDE (herein "IDE" refers to IDE server 130 and IDE client 105, as a whole) to collaborate with respect to a set of files.

In FIG. 2, collaborating program 110 could be collaborating program 110-1, collaborating program 110-2, or another collaborating program 110 on another computing device that communicates with one or more other collaborating programs 110 within an IDE client 105.

In step 210, collaborating program 110 receives a selection of a file about which a first user wants to collaborate with a second user. In one embodiment, a user right clicks on a file, and upon right clicking, a drop down menu appears with an option to collaborate with the second user with respect to the selected file, and the user clicks collaborate. In other embodiments, a user drags and drops a file into a "collaborating" area within the IDE. In one embodiment, the selected file is a source code file associated with a software development project. In other embodiments, the selected file is a file that contains a portion of the source code associated with a software development project. Portions of the source code may be stored in multiple files. In some embodiments (not shown), the selected file can include version identifiers identifying files stored in a VCS (version control system) code database. Still, in other embodiments, the file is selected from amongst multiple different versions of the same file. In some embodiments, the selected file is of an earlier version rather than of a most recent version of the file.

In step 220, collaborating program 110 receives a choice of identification parameters for the file(s) to be selected. Examples of identification parameters include, but are not limited to: all open files; all open files of a particular extension; a new user experience to pick and choose amongst the files; most recent edited files; files specific to an outgoing changeset; etc. In one embodiment, collaborating program 110 receives a choice of one identification parameter. In other embodiments, collaborating program 110 receives a choice of multiple identification parameters.

In step 230, collaborating program 110 retrieves, at least, a second user, based on a selection from a first user, with whom to collaborate with respect to the file(s) to be selected. In one embodiment, the second user is selected from a retrieved list associated with one or more source code files. In other embodiments, the second user is associated with the particular software development project, e.g., team members working on a specific program. In one embodiment, collaborating program 110 retrieves one user in the list. In other embodiments, collaborating program 110 retrieves multiple users in the list. In some embodiments, collaborating program 110 retrieves all users in the list associated with the particular software development project. Still, in other embodiments, collaborating program 110 retrieves specific users in the list, based on received information from the first user.

In step 240, collaborating program 110 causes the selected file to be identified for the second user. In one embodiment, collaborating program 110 sends a notification that an initiating user wants to collaborate with respect to a set of files. In some embodiments, collaborating program 110 sends a request to join a collaborative session involving the selected file. In other embodiments, collaborating program 110 causes the selected file to be identified, using the identification parameters, to the user. In some embodiments, code program 110 causes the selected file to be displayed. The initiating user and the accepting user may now discuss the files using any form of communication. Examples of communication include, but are not limited to: email, instant messaging, text, telephone, etc.

In one embodiment, the source code stored to the files may be scrolled to the location as identified by the cursor location of the initiating user. In other embodiments, as the initiating user scrolls through the file contents to discuss, the accepting user's display of the source code also scrolls, but the initiating user cannot view what the accepting user sees on his/her desktop. Rather, only the selected information in the IDE will be visible to the accepting user, as opposed to everything on the desktop of the initiating user. In some embodiments, if the contents of the file are different within the initiating user's and accepting user's workspaces because each had modified the file locally, the display may be optionally modified to display the two sets of contents side-by-side and allow navigation within.

In one embodiment (not shown), collaborating program 110 within the accepting user's IDE client 105 receives a notification that the initiating user wants to collaborate with respect to a set of files. The accepting user can deny the request or accept the request. If the accepting user denies the request, the accepting user's IDE client 105 remains the same and a notification of denial is returned to the initiating user. Conversely, if the accepting user accepts the request, a number of things may happen: (1) the accepting user may choose to close existing open files and replace the open files with the files specified by the initiating user; (2) the accepting user may open the newly selected files for collaboration files along with the currently open files; (3) the accepting user's file tab associated with the selected files, or the background/color scheme of the area where the source code is written, may be visibly different from tabs for other files that are not part of the collaborative session (e.g., different background color or highlighting, different font color, include the identity of the initiating user, or any other styling); and (4) the accepting user may be prompted if a previous version rather than the latest version of the selected file for collaboration (with the option to retrieve and display the same version of the file that the initiating user is viewing or view a merged version of the file).

Figure 3:
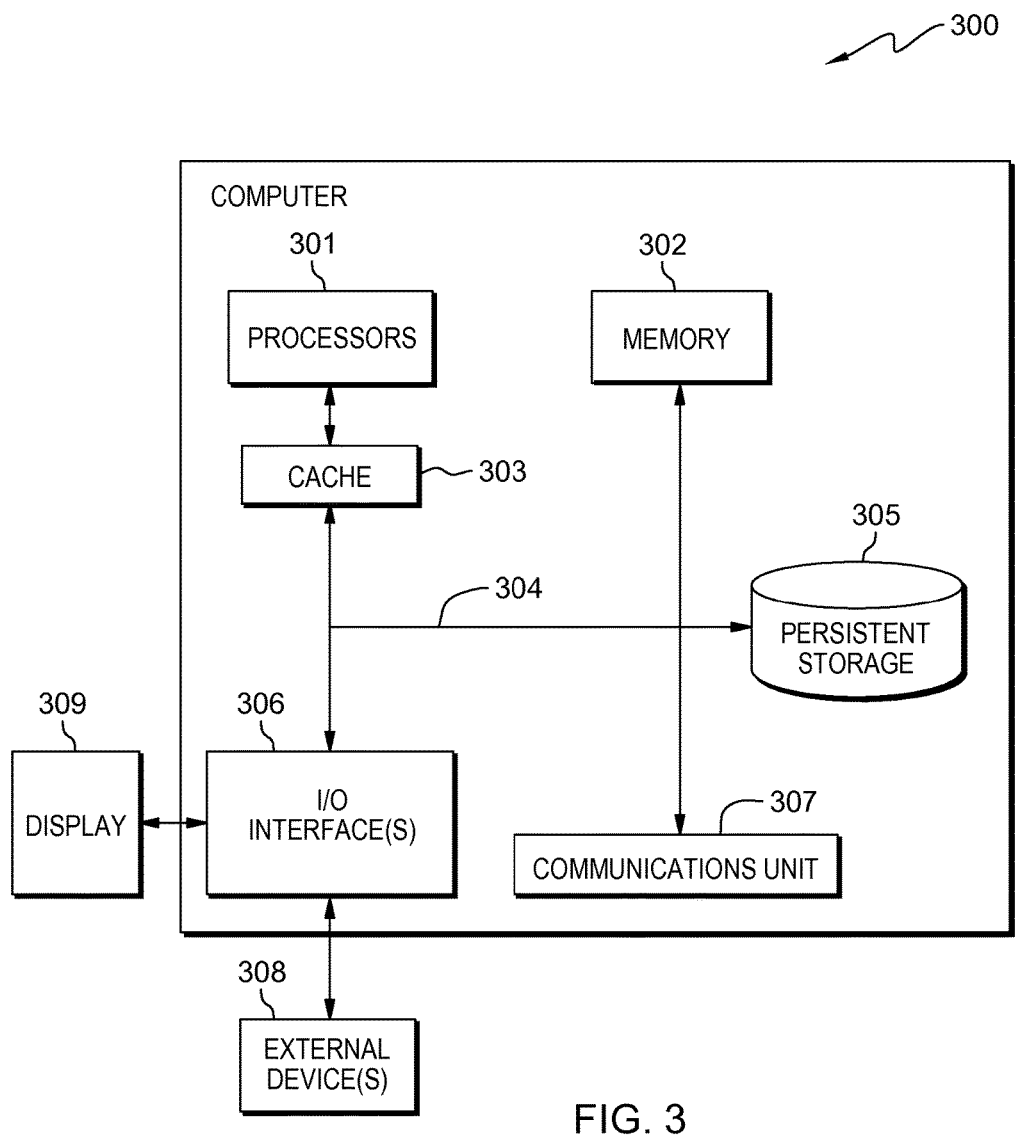
FIG. 3 depicts a block diagram of components of the server and/or the computing device of FIG. 1, in accordance with an embodiment of the present invention.

FIG. 3 depicts computer system 300, which is an example of a system, such as server 30, computing device 40, and/or computing device 50. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. IDE server 130 may be downloaded to persistent storage 305 of server 30 through communications unit 307 of server 30. IDE client 105-1, user interface 120-1, and collaborating program 110-1 may be downloaded to persistent storage 305 of computing device 40 through communications unit 307 of computing device 40. IDE client 105-2, user interface 120-2, and collaborating program 110-2 may be downloaded to persistent storage 305 of computing device 50 through communications unit 307 of computing device 50.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., IDE server 130, can be stored on such portable computer readable storage media and can be loaded onto persistent storage 305 of server 30 via I/O interface(s) 306 of server 30. Software and data used to practice embodiments of the present invention, e.g., IDE client 105-1, user interface 120-1, and collaborating program 110-1, can be stored on such portable computer readable storage media and can be loaded onto persistent storage 305 of computing device 40 via I/O interface(s) 306 of computing device 40. Software and data used to practice embodiments of the present invention, e.g., IDE client 105-2, user interface 120-2, and collaborating program 110-2, can be stored on such portable computer readable storage media and can be loaded onto persistent storage 305 of computing device 50 via I/O interface(s) 306 of computing device 50. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically collaborating with respect to a file within an integrated development environment (IDE), the method comprising:
    receiving, by one or more processors, from a first IDE of a first user, a selection of a first version of a source code file associated with a software development project;
    receiving, by one or more processors, a first user choice of one or more file identification parameters for the first version of the source code file, wherein the chosen file identification parameters are selected by the first user from among a group of file identification parameters provided to the first user that includes all of the options of: all open files, all open files of a particular extension, a new user experience to pick and choose amongst the files, most recent edited files, and files specific to an outgoing changeset;
retrieving, by one or more processors, a list of users assigned to the software development project, including at least a second user, based on the first user's selection of the first version of the source code file associated with the software development project;
causing, by one or more processors, the first version of the source code file to be identified in a second IDE of the second user, based, at least, upon: (1) the chosen file identification parameters and (2) a selection of the first user with whom to collaborate from the retrieved list of users assigned to the software development project;
opening, by one or more processors, the first version of the source code file in the second IDE of the second user;
receiving, by one or more processors, information indicating that the first user is scrolling to a first section of the first version of the source code file in the first IDE;
causing, by one or more processors, an analogous scrolling of the first version of the source code file in the second IDE of the second user, wherein the second user is only allowed to view the first version of the source code file and not everything on a desktop of the first user; and
allowing, by one or more processors, the first user and the second user to collaborate on the first version of the source code file concurrently, wherein the first user and the second user view the first version of the source code file simultaneously.

2. The method of claim 1, wherein the first user's version of the source code file is of a different version than a second user's version of the source code file and the second user is prompted to display a portion of the first user's version of the source code file in lieu of that portion of the second user's version of the source code file.

3. The method of claim 1, wherein the first IDE of the first user and the second IDE of the second user include a distinct file tab, wherein the distinct file tab appears visibly different for files that are part of a collaboration session from tabs for other files that are not part of the collaboration session.

4. The method of claim 3, wherein a visible difference of the distinct file tab associated with a file that is part of the collaboration session is selected from the group consisting of a different background color, a different highlighting, and a different font color.

5. The method of claim 1, further comprising:
determining, by one or more processors, the first user and the second user each modified the first version of the source code file locally;
displaying, by one or more processors, the first user's modification and the second user's modification side-by-side within the first IDE and within the second IDE, allowing navigation within.

6. The method of claim 1, subsequent to retrieving a list of users assigned to the software development project, further comprising:
receiving, by one or more processors, a notification that the first user wants to collaborate with the second user;
receiving, by one or more processors, a notification that the second user accepted the first user's request to collaborate; and
receiving, by one or more processors, a notification that the second user chooses to close existing open files and replace the existing open files with the first version of the source code file.

7. The method of claim 1, subsequent to retrieving a list of users assigned to the software development project, further comprising:
receiving, by one or more processors, a notification that the first user wants to collaborate with the second user;
receiving, by one or more processors, a notification that the second user accepted the first user's request to collaborate; and
receiving, by one or more processors, a notification that the second user chooses to open the first version of the source code file along with existing open files.

8. The method of claim 1, subsequent to retrieving a list of users assigned to the software development project, further comprising:
receiving, by one or more processors, a notification that the first user wants to collaborate with the second user;
receiving, by one or more processors, a notification that the second user denied the first user's request to collaborate; and
sending, by one or more processors, a notification of denial to the first user that alerts the first user that the second user has denied the first user's request to collaborate with the second user.

9. A computer program product for dynamically collaborating with respect to a file within an integrated development environment (IDE), the computer program product comprising:
one or more computer readable storage media and program instructions stored on the one or more computer readable storage media, the program instructions comprising:
program instructions to receive from a first IDE of a first user, a selection of a first version of a source code file associated with a software development project;
program instructions to receive a first user choice of one or more file identification parameters for the first version of the source code file, wherein the chosen file identification parameters are selected by the first user from among a group of file identification parameters provided to the first user that includes all of the options of: all open files, all open files of a particular extension, a new user experience to pick and choose amongst the files, most recent edited files, and files specific to an outgoing changeset;
program instructions to retrieve a list of users assigned to the software development project, including at least a second user;
program instructions to cause the first version of the source code file to be identified in a second IDE of the second user, based, at least, upon: (1) the chosen file identification parameters and (2) a selection of the first user with whom to collaborate from the retrieved list of users assigned to the software development project;
program instructions to open the first version of the source code file in the second IDE of the second user;
program instructions to receive information indicating that the first user is scrolling to a first section of the first version of the source code file in the first IDE;
program instructions to cause an analogous scrolling of the first version of the source code file in the second IDE of the second user, wherein the second user is only allowed to view the first version of the source code file and not everything on a desktop of the first user; and program instructions to allow the first user and the second user to collaborate on the first version of the source code file concurrently, wherein the first user and the second user view the first version of the source code file simultaneously.

10. The computer program product of claim 9, wherein the first user's version of the source code file is of a different version than a second user's version of the source code file and the second user is prompted to display a portion of the first user's version of the source code file in lieu of that portion of the second user's version of the source code file.

11. The computer program product of claim 9, wherein the first IDE of the first user and the second IDE of the second user include a distinct file tab, wherein the distinct file tab appears visibly different for files that are part of a collaboration session from tabs for other files that are not part of the collaboration session.

12. The computer program product of claim 11, wherein a visible difference of the distinct file tab associated with a file that is part of the collaboration session is selected from the group consisting of a different background color, a different highlighting, and a different font color.

13. A computer system for dynamically collaborating with respect to a file within an integrated development environment (IDE), the computer system comprising:

one or more computer processors, one or more computer readable storage media, and program instructions stored on the computer readable storage media for execution by at least one of the one or more processors, the program instructions comprising:

program instructions to receive from a first IDE of a first user, a selection of a first version of a source code file associated with a software development project;

program instructions to receive a first user choice of one or more file identification parameters for the first version of the source code file, wherein the chosen file identification parameters are selected by the first user from among a group of file identification parameters provided to the first user that includes all of the options of: all open files, all open files of a particular extension, a new user experience to pick and choose amongst the files, most recent edited files, and files specific to an outgoing changeset;

program instructions to retrieve a list of users assigned to the software development project, including at least a second user;

program instructions to cause the first version of the source code file to be identified in a second IDE of the second user, based, at least, upon: (1) the chosen file identification parameters and (2) a selection of the first user with whom to collaborate from the retrieved list of users assigned to the software development project;

program instructions to open the first version of the source code file in the second IDE of the second user;

program instructions to receive information indicating that the first user is scrolling to a first section of the first version of the source code file in the first IDE;

program instructions to cause an analogous scrolling of the first version of the source code file in the second IDE of the second user, wherein the second user is only allowed to view the first version of the source code file and not everything on a desktop of the first user; and program instructions to allow the first user and the second user to collaborate on the first version of the source code file concurrently, wherein the first user and the second user view the first version of the source code file simultaneously.

14. The computer system of claim 13, wherein the first user's version of the source code file is of a different version than a second user's version of the source code file and the second user is prompted to display a portion of the first user's version of the source code file in lieu of that portion of the second user's version of the source code file.

15. The computer system of claim 13, wherein the first IDE of the first user and the second IDE of the second user include a distinct file tab, wherein the distinct file tab appears visibly different for files that are part of a collaboration session from tabs for other files that are not part of the collaboration session.

16. The computer system of claim 15, wherein a visible difference of the distinct file tab associated with a file that is part of the collaboration session is selected from the group consisting of a different background color, a different highlighting, and a different font color.

* * * * *